(12) United States Patent
Pien

(10) Patent No.: US 10,684,609 B2
(45) Date of Patent: Jun. 16, 2020

(54) PROGRAM CODE GENERATING METHOD FOR TILTED PLANE MACHINING BY MULTI-AXIS MACHINE TOOL AND DEVICE THEREOF

(71) Applicant: Hurco Automation, Ltd., Hsinchu County (TW)

(72) Inventor: Pin-Yuang Pien, Taipei (TW)

(73) Assignee: Hurco Automation, Ltd., Zhubei (TW)

( * ) Notice: Subject to any disclaimer, the term of this patent is extended or adjusted under 35 U.S.C. 154(b) by 65 days.

(21) Appl. No.: 16/174,401

(22) Filed: Oct. 30, 2018

(65) Prior Publication Data

US 2020/0133231 A1    Apr. 30, 2020

(51) Int. Cl.
G05B 19/4097    (2006.01)

(52) U.S. Cl.
CPC .......... *G05B 19/4097* (2013.01); *G05B 2219/35134* (2013.01); *G05B 2219/35218* (2013.01)

(58) Field of Classification Search
CPC .................................................. G05B 19/4097
See application file for complete search history.

(56) References Cited

U.S. PATENT DOCUMENTS

| | | | | |
|---|---|---|---|---|
| 6,519,860 B1 * | 2/2003 | Bieg | ........................ | B23H 7/26 33/1 PT |
| 2003/0158622 A1 * | 8/2003 | Corey | .............. | G05B 19/40937 700/193 |
| 2005/0071021 A1 * | 3/2005 | Weinhofer | ............. | B25J 9/1664 700/63 |

* cited by examiner

*Primary Examiner* — Mark A Connolly

(57) ABSTRACT

A program code generating method for tilted plane machining makes the machine tool generate required program codes for machining a plurality of planes with various direction features. The method comprises: obtaining step of obtaining directional features of a first reference plane and a second reference plane; transformation step of obtaining coordinate transformations parameters between the directional features of the first reference plane and the second reference plane by coordinate transformations; testing step of making a tool shaft and a worktable of the machine tool perform a testing motion; and combining step of generating a combination code by adding the coordinate transformations parameters in the program codes applied to machining of the first reference plane, thereby making the machine tool subsequently perform machining on the second reference plane after performing machining on the first reference plane by using the combination code. A device for titled plane machining is also provided.

8 Claims, 9 Drawing Sheets

74(70)

PART PROGRAM EDITOR (PROGRAM NAME)
N10 G90 G94 G17 G49 G40 G80
N15 G20
N20 G28 G91 Z0.
N25 G90
N30 T2 M06
N35 T4
N40 S5000 M03
N50 G68.2 X0. Y0. Z0. I7.934 J75. K-155.831
N55 G53.1
N60 M08
N70 G00 X-1.5045 Y-1.1394
N75 G43 X3.6748 H02
N80 G00 Z1.1113
N85 G01 Z1.0363 F40

G68.2 TILE PLANE

| ID | 1 ▽ |
| X | 0.000 |
| Y | 0.000 |
| Z | 0.000 |
| A | 7.934 |
| B | 75.000 |
| C | 155.831 |

CANCEL | INSERT

FILE MANAGER | | | SAVE | SAVE AS | BACK

FIG. 7

PROGRAM CODE GENERATING METHOD FOR TILTED PLANE MACHINING BY MULTI-AXIS MACHINE TOOL AND DEVICE THEREOF

FIELD OF THE INVENTION

The present disclosure relates to a program code generating method of multi-axis machine tool as well as a device thereof, and more particularly, to program code generating method for tilted plane machining by multi-axis machine tool as well as a device thereof.

BACKGROUND

In current manufacturing engineering, five-axis computer numerically controlled (CNC) machine tools are more and more applied in the processing industry. A five-axis CNC machine tool refers to a CNC machine tool having three orthogonal axes and many swivel shafts, which uses a spindle to rotate a cutting tool to remove material from a workpiece; and then the workpiece can tilt at some angle via the swivel shaft so as to perform tilted plane machining or dynamically reorient the cutting tool to perform complicated multi-axis cutting process. However, since the increase in degrees of freedom accompanies an increase in the complexity of workpiece arrangement and workpiece program, both are significant challenges to conventional machining operations.

The practicality of the five-axis CNC machine tool has a significantly upward trend which can be attributed to two main types of machining applications. The first major application is to manufacture complicated geometrical form that requires precise control on the pose of the tool or workpiece so as to complete the processing of complicated spatial geometrical form. This application usually focuses on complicated curves and the gear is machined in contour paths of various roll angles of the tool shaft. The second major application of five-axis machining is the fabrication of three-axis or four-axis workpieces that require machining on multiple planes, and using a five-axis CNC machine tool can reduce errors and increase efficiency by. Compared to traditional three-axis or four-axis machining, the advantage is that a operator does not have to carry out multiple settings, reset a tool or a workpiece for origin shift, and set up many workpiece programs for each machining process under the limitation from a three-axis or four-axis machine tool. This kind of application is usually referred to as five-axis machining on an inclined plane, the major application requirement of a five-axis CNC machine tool.

Though the above-mentioned five-axis machining on inclined plane is basically the three-axis machining on various workpiece planes, significant differences actually exist in the process flow. As for the five-axis tilted plane machining, additional degree of freedom needs to be controlled, and the type of the machine tool as well as the practical mechanical design are also different. Therefore, complexity over position commands and the relative coordinate system transformations in the machining process shows significant increase.

For example, in the settings of the machining path of the traditional three-axis CNC machine tool, as long as the reference point and the actual working position of the tool are the same, the same program code can be applied in various machine tools and the same machining result is obtained; but when a five-axis CNC machine tool performs machining along the path with tilted planes, transformations of the reference frame is involved and the coordinate system transformations is affected by size or type of the machine itself. Therefore, when the program codes of the same contour path is applied in various machines, different forms by machining are probably obtained and even they cannot be read for machine type.

Therefore, the workpiece programs executed by a five-axis CNC machine tool mostly need additional computer equipments, and are generated by Computer Aided Design (CAD) and Computer-Aided Manufacturing (CAM) software exclusively corresponding to practical application, which are different from the traditional three-axis machine tool. The workpiece program of a three-axis machine tool can usually be programmed directly on the machine tool through manual operation or built-in interactive editor of control system, so that immediately modifying the machining program directly on the machine is difficult for a five-axis CNC machine tool.

SUMMARY

The main purpose of the present invention is to provide a coding method of a multi-axis machine tool for tilted plane machining, such that a user generates the program code for tilted plane machining directly on the machine tool in the case of not relying on external apparatus.

The secondary purpose of the present invention is to provide a multi-axis machine tool for tilted plane machining, such that a user generates the program code for tilted plane machining directly on the machine tool in the case of not relying on external CAD/CAM systems.

To achieve above purposes, a program code generating method for tiled plane machining by a multi-axis machine tool of the present invention makes a machine tool generate required program codes for machining a plurality of planes with various direction features. The method includes: a obtaining step, a transformation step, a testing step and a combining step.

In the obtaining step, direction features of a first reference plane and a second reference plane are obtained; and then in the transformation step coordinate transformations parameters between the direction features of the first reference plane and the second reference plane are obtained through coordinate transformations; more specifically, coordinate transformations parameters are obtained on matrix computation.

In the testing step, a tool shaft and a worktable of the machine tool perform a testing motion by using the coordinate transformations parameters and whether the testing motion can be performed is confirmed for avoiding a problem that mathematical solutions exist but a machine tool actually is unable to work.

At last, in the combining step, a combination code is generated by adding program codes applied in machining of the first reference plane in the coordinate transformations parameters, such that the machine tool subsequently performs machining on the second reference plane after performing machining on the first reference plane by using the combination code.

As for the ways to obtain direction features of the first reference plane and the second reference plane, the direction features of the first reference plane are generated by predetermined setting in one embodiment; through sensors detecting the location of a positioning component to generate a plurality of position parameters, the direction features of the second reference plane are further generated from the position parameters; wherein the predetermined direction features, in various embodiments, may be plane features of a horizontal plane or can be determined by motion shaft direction of the machine tool; in various embodiments, the positioning component may be the edge or the tip of a tool yet or a probe, and also can be the worktable clamping and moving a workpiece; in various embodiment, the sensors can generate the position parameters through detecting the location or motion type of the positioning components.

In another embodiment, the direction features of the first reference plane and the second reference plane are obtained from a 3D model.

Furthermore, in one embodiment, in order to prevent a rotation center of the tool tip from contacting the workpiece to further affect machining, in the obtaining step, an included angle between a tool shaft of the machine tool and the second reference plane can be further obtained.

The machine tool of tilted plane machining provided by the present invention can generate required program codes for machining a plurality of planes with various direction features and has a worktable and a tool driven by three controlled linear axis and two controlled swivel shaft to perform relative movement. The machine tool comprises an obtaining module, a computing module and a combining module.

The obtaining module is adapt to acquire direction features of the first reference plane and the second reference plane; through coordinate transformations, the computing module is adapt to obtain coordinate transformations parameters between the direction features of the first reference plane and the second reference plane; while the combining module is adapt to generate a combination code by adding program codes applied to the machine tool in the coordinate transformations parameters, and thus the machine tool machines a plurality of planes with various direction features by using the combination code.

Wherein, after the computing module calculates the coordinate transformations parameters, the machine tool would use the coordinate transformations parameters to make the tool and the worktable perform a testing motion and the combining module proceeds to run after ensuring that the testing motion can be carried out.

As for the detailed types of the obtaining module, in one embodiment, the obtaining module comprises at least one sensor detecting the location of a positioning component; through the sensor generating a plurality of position parameters, the direction features of the second reference plane are generated from the position parameters; in the same embodiment the direction features of the first reference plane are generated by predetermined setting, but the type of apparatus generating the direction features of the first reference plane is not limited.

In another embodiment, the obtaining module comprises a model reading apparatus for input a 3D model, and the direction features of the first reference plane as well as the second reference plane are obtained via the 3D model.

In order to help a user conveniently observe the spatial relationship between the first reference plane and the second reference plane, the machine tool comprises an interactive operating interface in one embodiment, and the interactive operating interface can show the spatial relationship between the first reference plane and the second reference plane in a virtual space.

As can be seen from above description, the present invention features machining programs of machining multiple tilted planes directly generated by the machine tool without relying on external CAD/CAM systems. Through setting each of multiple tilted planes as a separately independent working coordinate system having the position and the direction, thus when coding, as long as the reference point position of the coordinate system on the inclined plane and the working path on the inclined plane are known, the path setting can be performed on the plane through the coordinate transformations parameters by using the inputted parameters similar to those of the usual horizontal plane machining; wherein after the coordinate transformations parameters are generated, the machine tool also practically test whether the motion can be performed on the coordinate plane transformed from the coordinate transformations parameters so as to ensure that the coordinate transformations parameters can be actually used.

Therefore, the CNC machine tool can perform machining on each inclined plane with automatically relocating the actual workpiece or cutting tool by machinery kinematics calculation truly according to the coordinate transformations parameters and the machining commands for machining the inclined plane, and then the machining process of a workpiece of five-axis inclined plane is easily accomplished.

BRIEF DESCRIPTION OF THE DRAWINGS

To more clearly illustrate embodiments of the application or technical solutions in the prior art, drawings to be used in the description of the embodiments of the application or the prior art will be briefly introduced hereinafter. Apparently, the drawings in the description below are merely some embodiments of the disclosure, a person skilled in the art can obtain other drawings according to these drawings without creative efforts. In the figures:

FIG. 7 is a schematic illustrating an interface of managing the motion code according to the embodiment in FIG. 3;

DETAILED DESCRIPTION OF PREFERRED EMBODIMENTS

In order to further understand the structure, usage and features of the present disclosure more clearly, the present disclosure is described in detail below with references to the accompanying drawings and specific preferred embodiments.

Figure 1:
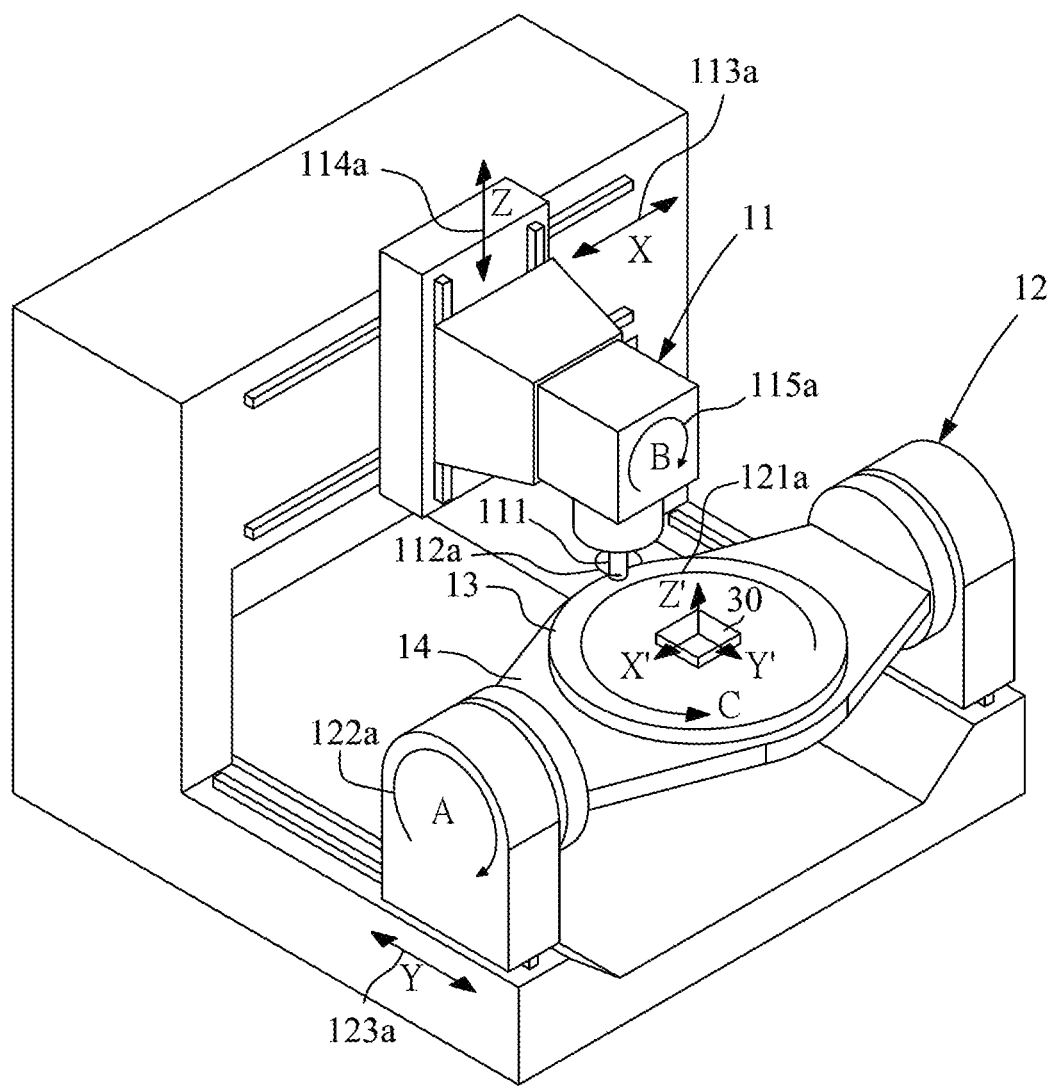
FIG. 1 is a schematic illustrating hardware of multi-axis machine tool for tilted plane machining provided by the present invention.
Figure 2:
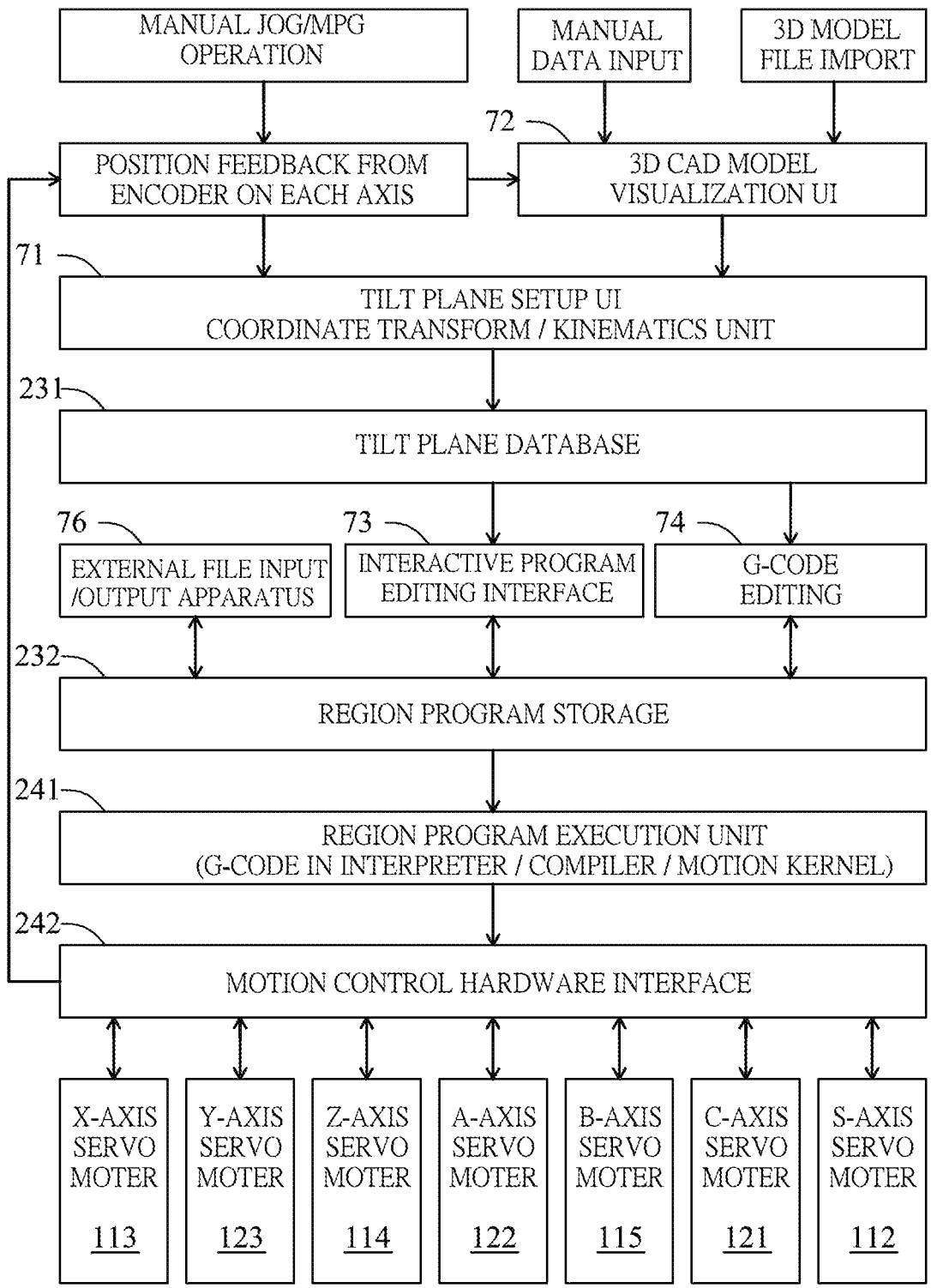
FIG. 2 is a schematic illustrating block diagram of gear hardware in FIG. 1.
Figure 3:
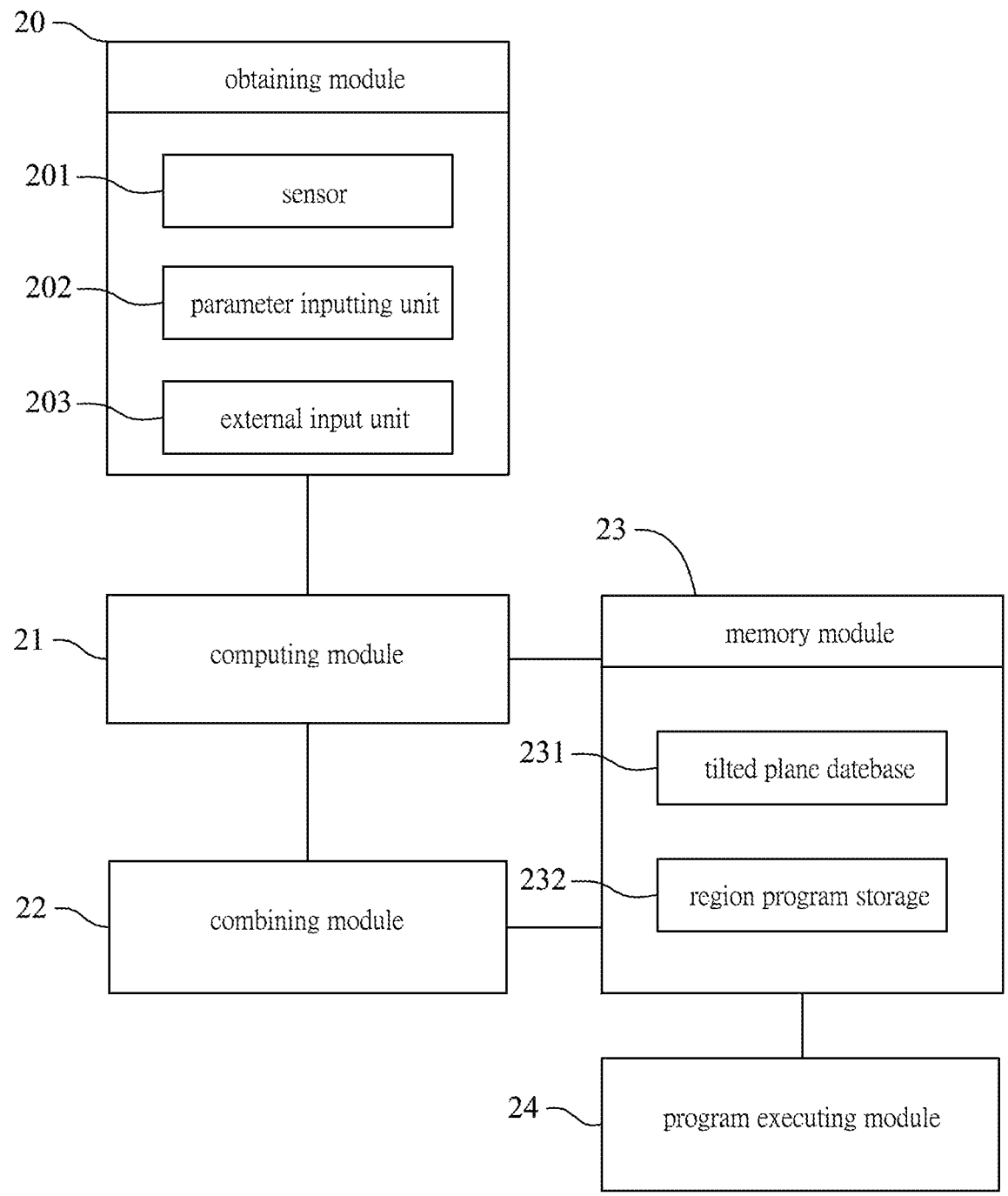
FIG. 3 is a schematic illustrating function flow chart of the program code generating method for tilted plane machining by multi-axis machine tool according to one embodiment.

Please refer to FIG. 1 through FIG. 3. Through a program code generating method for a multi-axis machine tool 10 in tilted plane machining provided by the present invention, the multi-axis machine tool 10 provided by the present invention machines a workpiece 30. In a preferable embodiment, above-mentioned machine tool 10 comprises a working head 11, a worktable 12 for fixing the workpiece 30, an obtaining module 20 for executing the program code generating method, a computing module 21, a combining module 22, a memory module 23 and a program executing module 24.

As shown in FIG. 1, in the present embodiment, a tool 111 is mounted on the working head 11, and an S-axis servomotor 112 drives the tool 111 to spin on a tool shaft 112a for machining the workpiece 30. The working head is driven by a X-axis servomotor 113, a Z-axis servomotor 114 and a B-axis servomotor 115 (not shown in FIG. 1), making the tool 111 move on a X-axis 113a parallel to the ground as well as a Z-axis 114a vertical to the ground, and rotate around a B-axis 115a.

As for the worktable 12, in the present embodiment, the worktable 12 has a first rotatory stage 13 driven by a C-axis servomotor 121 to swivel on a C-axis 121a. The first rotatory stage 13 is attached to a second rotatory stage 14 driven by an A-axis servomotor 122 to swivel on an A-axis 122a which is vertical to the C-axis 121a, and the second rotatory stage 14 is also driven by a Y-axis servomotor 123 to move linearly on a Y-axis 123a which is vertical to both of the Z-axis 114a and the X-axis 113a. Thus, the workpiece 30 fixed on the worktable 12 and the tool 111 can move relatively to each other in six degrees of freedom.

Please refer to FIG. 3. The obtaining module 20 is adapt to acquire features information of a first reference plane 40 applied in machining and a second reference plane 41 applied in machining. The features information includes direction features at a reference point and corresponding to the reference plane; as for hardware, the obtaining module 20 comprises a plurality of sensors 201 detecting positioning components, parameter inputting unit 202 adapt to be inputted parameter data by users and a external input unit 203 adapt to receive data from a external electronic device.

In various embodiments, the positioning component may be the tool 111 mounted on the working head 11 or a probe, and a plurality of position coordinates are obtained through sensing the edge or the tip of the tool 111 or the probe contacting the machined workpiece; alternatively, a plurality of position parameters are obtained from the position coordinates through the positions of worktable 12 when moving the workpiece 30, so that the plurality of position parameters are later used to position the reference points and the direction features defining the first reference plane 40 and the second reference plane 41; wherein, the sensors 201 may be feedback encoders mounted on each axis to detect the positioning components location after moving, and the position parameters also may be obtained by detecting motion variation of the position components on each axis; the parameter inputting unit 202 may be a keyboard or a mouse arranged at the machine tool 10 and the external input unit 203 may be a port connecting with internet or Universal Serial Bus (USB) so as to act as a 3D model reading apparatus.

Through coordinate transformations, the computing module 21 is adapt to obtain coordinate transformations parameters 50 between the direction features of the first reference plane 40 and the second reference plane 41 after acquiring the direction features of the first reference plane 40 and the second reference plane 41.

The combining module 22 is adapt to generate a combination code 60 by adding program codes applied in performing machining by the machine tool 10 in the coordinate transformations parameters 50, and thus the machine tool 10 machines a plurality of planes with various direction features through the combination code 60.

As for specific operation flow of the machine tool 10 and the program codes generating method, please refer to FIG. 2. In one embodiment, the machine tool 10 provided by the present invention can acquire the plane features of the first reference plane 40 and the second reference plane 41 in three ways which separately are manually practical operating the tool 111 of the machine tool 10 or the worktable 12, directly manually inputting the parameters and 3D model files. Practical operation flow of these three ways will be described as follows.

In the present embodiment, as for the way of obtaining the direction features through manually practical operating the tool shaft 112a of the machine tool 10 or the worktable 12, please refer to FIGS. 1 to 5. First, above-mentioned obtaining step is performed. In the obtaining step, operating personnel first dispose the workpiece 30 onto the worktable 12, select a manually operating input mode 701 in an interactive program editing interface 73 of a tilted plane setup interface 71 of an interactive operation interface 70 and then operate the machine tool 10 through manual JOG operation or Manual Pulse Generator (MPG) as shown in figure which act as the parameter inputting unit 202. And then, relative movement is made between the worktable 12 and the tool shaft 112a, and the tool 111 mounted on the tool shaft 112a or the probe is made to contact the workpiece 30. And then the machine tool 10 reads the feedback from the sensors 201 mounted on the machine tool 10 so as to convert physical signals into the position parameters corresponding to practical coordinate positions. At last, the first reference plane 40, the second reference plane 41 and the direction features thereof are defined by the position parameters. And through connecting a visualized 3D model interface 72 in the interactive operation interface 70 to a screen of the machine tool 10, a user can show a virtual spatial relationship between the first reference plane 40 and the second reference plane 41 in the screen and transmit the direction features toward the computing module 21.

Figure 4:
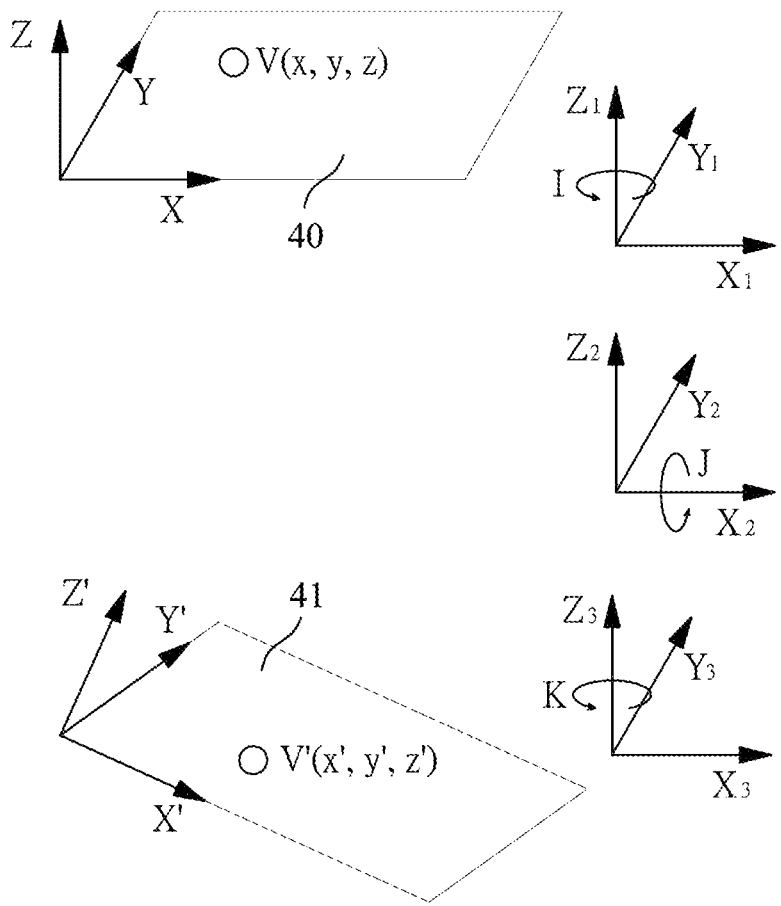
FIG. 4 is a schematic illustrating a interface of obtaining step performed by manually operating the machine tool according to the embodiment in FIG. 3.
Figure 5:
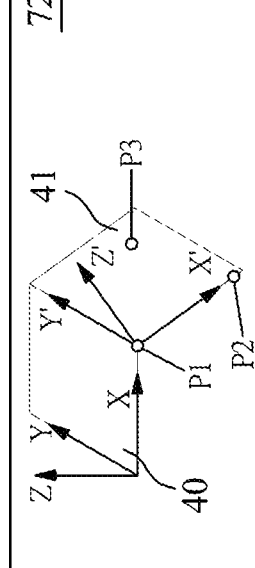
FIG. 5 is a schematic illustrating explanation of how to generate coordinate transformations parameters by interactive operating interface according to the embodiment in FIG. 3.

And then, as shown in FIGS. 4 and 5, after obtaining the direction features of the first reference plane 40 and the second reference plane 41, the computing module 21 further obtain coordinate transformations parameters 50 between the direction features of the first reference plane 40 and the second reference plane 41 by means of coordinate transformations computation on matrix computation and the result is displayed on the visualized 3D model interface 72 in the interactive operation interface 70.

For example, as shown in FIG. 5, suppose that the relative relationship between the first reference plane 40 and the second reference plane 41 can be obtained through describing the second reference plane 41 relative to the first reference plane 40 on a sequence of rotation around a Z-axis, a new X-axis and a new Z-axis. And then the second reference plane 41 can be described in terms of the features of the first reference plane 40 just through the combination of three angles I, J, K of Z1-axis, the new X-axis and the new Z-axis as well as three translations on X,Y, and Z. In the present embodiment, when G code is programming, this type of representation is usually expressed in the form of a tilted working plane command "G68.2 X_Y_Z_I_J_K_" (see FIG. 7). This means any subsequent command on each axis is executed as the new coordinate system assigned by the tilted working plane command used by the CNC system of the machine tool 10.

Wherein, the memory module 23 can save the coordinate transformations parameters 50 in a tilted plane database 231 set up by the memory module 23 and classify the coordinate transformations parameters 50 corresponding to different tilted plane by ID, so that the appropriate coordinate transformations parameters 50 for the relationship between the first reference plane 40 and the second reference plane 41 can be quickly acquired when used.

Afterward the combining module 22 reads the coordinate transformations parameters 50, and then generated the combination code 60 by means of adding the program code (G code) applied to the machine tool 10 in the coordinate transformations parameters 50 via either the interactive program editing interface 73 or a G code editing interface 74. And the combination code 60 is saved in region program storage 232 of the memory module 23. Through a region program executing unit 241 of the program executing module 24 (G code interpreter/compiler/motion kernel) after reading the combination code 60 and further through a motion control hardware interface 242 of the program executing unit 24, the machine tool 10 can controls the servomotors of X-axis, Y-axis, Z-axis, A-axis, B-axis and C-axis 113, 123, 114, 122, 115, 121 separately. Then, the machine tool 10 can machine a plurality of planes with various direction features according to the combination code 60; wherein, in the present embodiment, the region program storage 232 further connects with a external file input/output apparatus 76 (e.g., the internet port) which can input/output the combination code 60 toward other device from the external device.

Wherein, a testing step is included between above-mentioned transformation step and above-mentioned combining step; in the testing step, the machine tool 10 would use the coordinate transformations parameters 50 to make the tool 111 and the worktable 12 perform a testing motion for checking whether the second reference plane 41 can be machined and the combining step is performed after ensuring that the testing motion can be carried out.

Wherein, as for detail contents of the combination code 60 please refer to FIG. 7. In the present embodiment, the combination code 60 can be edited in the G code editing interface 74, wherein the combination code 60 includes a first program code 61 (first half part of the program code in FIG. 7) making the machine tool 10 move on the first reference plane 40 and a second program code 62 (last half part of the program code in FIG. 7) making the machine tool 10 move on the second reference plane 41. And the second program code 62 includes the first part of coordinate transformations parameters 50 and a sequent part of motion code 620 making the tool shaft 112a of the machine tool 10 and the worktable 12 move relatively to a reference point and perform relative movement on the second reference plane 41.

Figure 6:
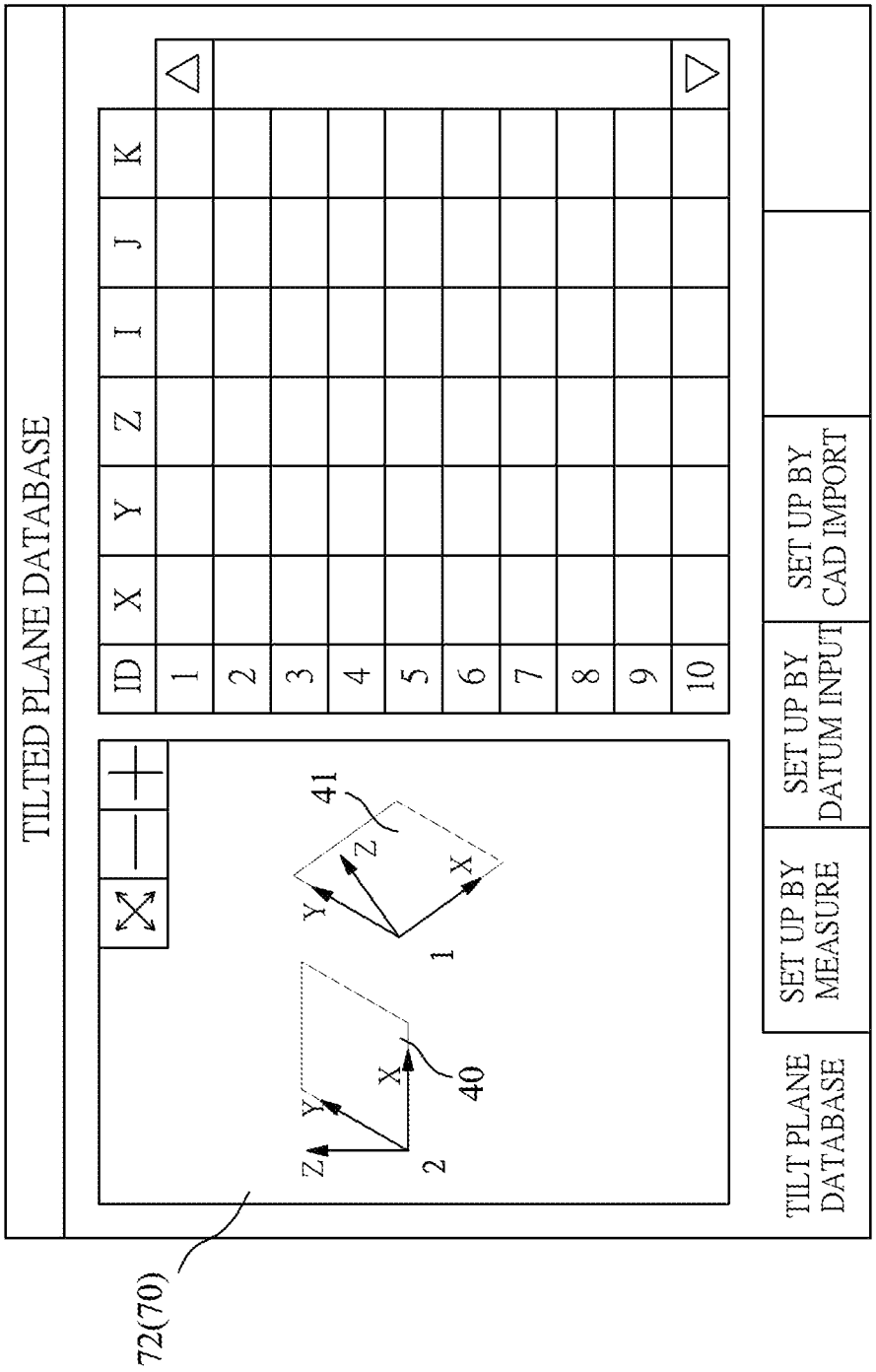
FIG. 6 is a schematic illustrating a management interface of managing coordinate transformations parameters according to the embodiment in FIG. 3.

In the FIG. 7, in order to conveniently insert the coordinate transformations parameters 50, a management interface 75 is in the interactive operation interface 70 as shown in FIG. 6, such that a user can use the ID and the management interface 75 to manage; wherein in the management interface 75, besides the type of directly indicating the direction features by numbers and showing the coordinate transformations parameters 50 by ID, the management interface 75 also includes the visualized 3D model interface 72 to display previews with the 3D view over the relationship between the first reference plane 40 and the second reference plane 41 in the space.

Figure 8:
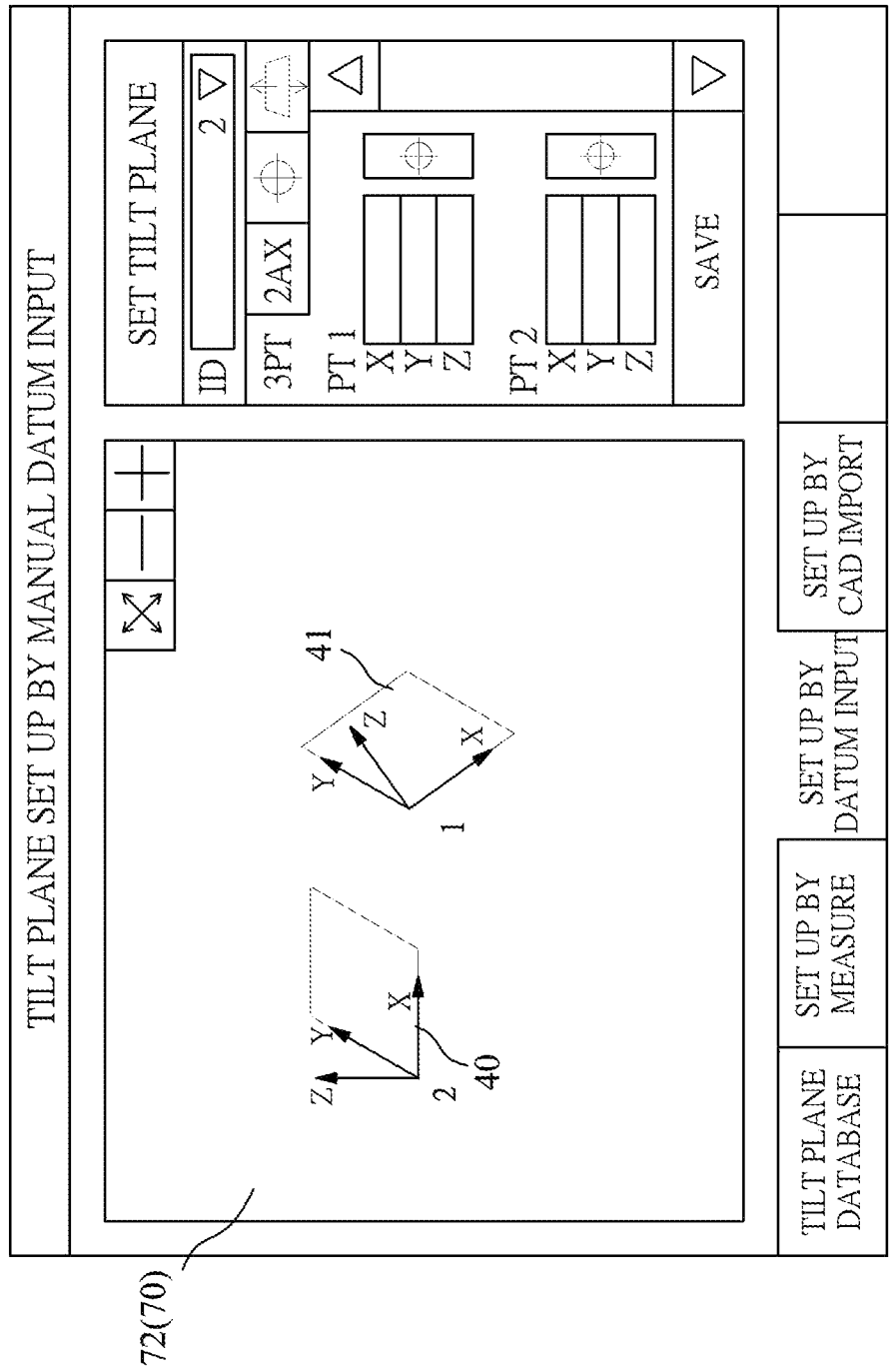
FIG. 8 is a schematic illustrating an interface of performing the obtaining step by inputting parameters according to the embodiment in FIG. 3.
Figure 9:
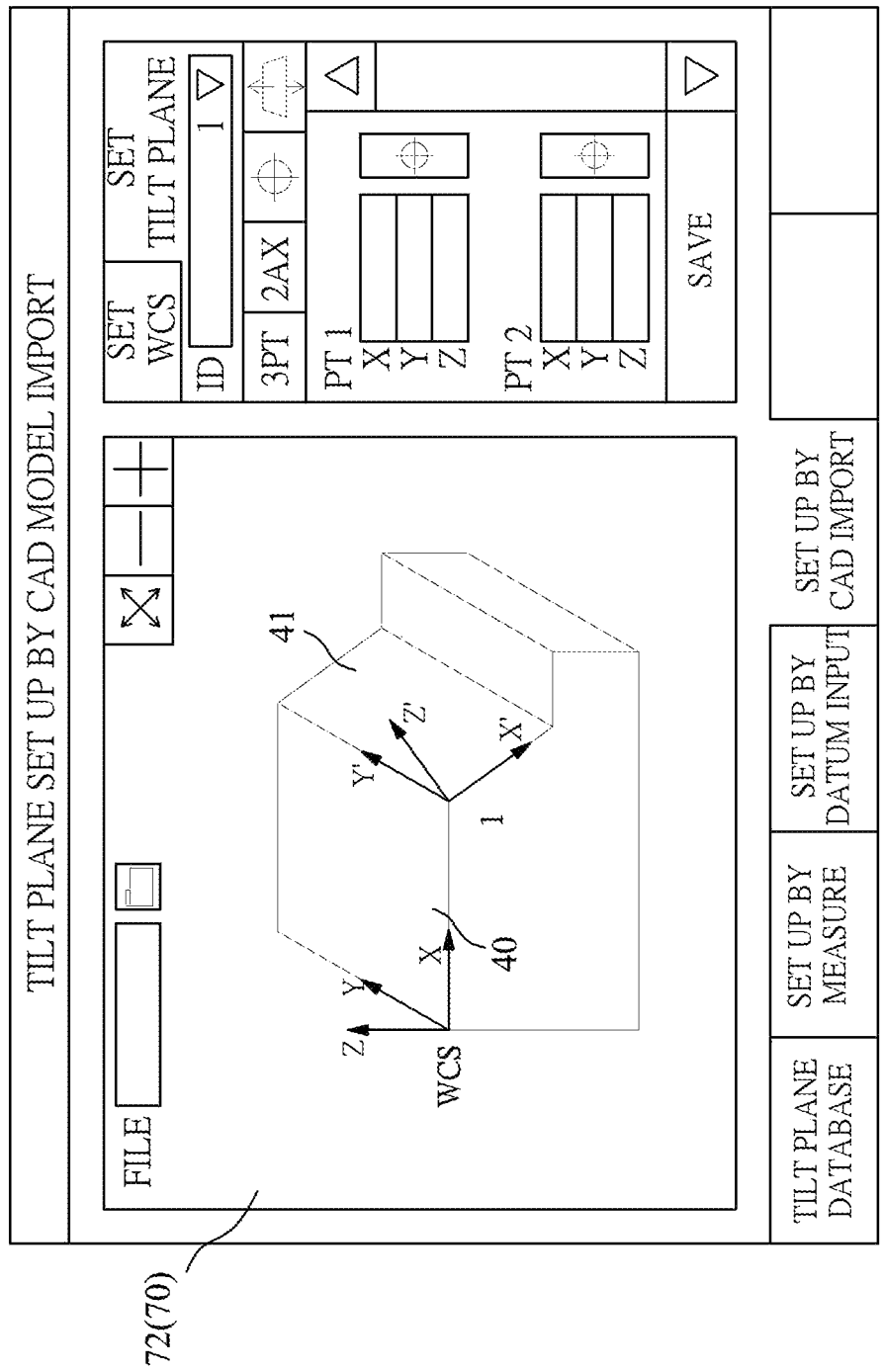
FIG. 9 is a schematic illustrating an interface of performing the obtaining step via a 3D model according to the embodiment in FIG. 3.

At last, please refer to FIG. 8 and FIG. 9 for the way of obtaining the direction features of the first reference plane 40 and the second reference plane 41 by means of directly manually inputting parameters or 3D model files.

As shown in FIG. 8, when deciding to generate the direction features of the first reference plane 40 and the second reference plane 41 by directly manually inputting parameters, operating personnel activate a parameter inputting mode 702 of the tilted plane setup interface 71. As shown in the figure, in the mode, a plane can be defined through three points or two axes can be defined by two lines. Once necessary coordinate data is inputted, the CAD engine would draw the map transformations which can be from capturing another origin or orientation and carry out the further arrangement; after inputting, the spatial relationship between the first reference plane 40 and the second reference plane 41 can also be previewed in the visualized 3D model interface 72. After the first reference plane 40 and the second reference plane 41 are defined, the result can be saved in the memory module 23 as well; as for the present method applied in subsequent flow about how the machine tool 10 generates the coordinate transformations parameters 50 by the generated first reference plane 40 and the second reference plane 41 as well as how to perform subsequent working, they are described in previous paragraph and will not be repeated here again.

At last, please refer to FIG. 9 which is about acquiring the direction features of the first reference plane 40 and the second reference plane 41. First, a 3D model inputting mode 703 of the tilted plane setup interface 71 is activated, then pre-established 3D files (STEP files or IGES files may be in the present embodiment) is acquired via the input device and then the first reference plane 40 is set via clicking the 3D model by the input device (it may be a mouse cursor or a touchscreen). Afterward, other points, axes or planes in the 3D model are selected to set the second reference plane 41 via the input device and the result is to be shown and verified in the screen via the visualized 3D model interface 72. Similarly, after the first reference plane 40 and the second reference plane 41 are defined, the result can be saved in the memory module 23. Again, as for the present method applied in subsequent flow about how the machine tool 10 generates the coordinate transformations parameters 50 as well as how to perform subsequent working, they are described in previous paragraph and will not be repeated here again.

The above-mentioned embodiments are used for conveniently describing the present invention, not further to limit it. For the person skilled in the art of the disclosure, without departing from the concept of the disclosure, simple modifications or changes can be made according to the claims and description of the present invention and should be included in the protection scope of the disclosure.

What is claimed is:

1. A program code generating method for tiled plane machining by a multi-axis machine tool makes a machine tool generate required program codes for machining a plurality of planes with various direction features, the method comprising:
   obtaining step, acquiring direction features of a first reference plane and a second reference plane;
   transformation step, acquiring, through coordinate transformations, coordinate transformations parameters between the direction features of the first reference plane and the direction features of the second reference plane;

testing step, making, by using the coordinate transformations parameters, a tool shaft and a worktable of the machine tool perform a testing motion and confirming that whether the testing motion can be performed; and combining step, generating, by adding program codes applied to machining of the first reference plane in the coordinate transformations parameters, a combination code, thereby making the machine tool subsequently perform machining on the second reference plane after performing machining on the first reference plane by using the combination code.

2. The program code generating method according to claim 1, wherein the direction features of the first reference plane are generated by predetermined setting; and the direction features of the second reference plane are generated by a plurality of position parameters after a sensor senses the location of a positioning component to generate the position parameters.

3. The program code generating method according to claim 1, wherein the direction features of the first reference plane and the second reference plane are obtained from a 3D model.

4. The program code generating method according to claim 1, wherein in the obtaining step, an included angle between a tool shaft of the machine tool and the second reference plane is further to be obtained.

5. A machine tool for tilted plane machining able to generate required program codes for machining a plurality of planes with various direction features and having a worktable and a tool, the worktable and the tool being driven by three controlled linear axis and two controlled swivel shaft to perform relative movement, the machine tool comprising:

a obtaining module adapt to acquire direction features of a first reference plane and a second reference plane;

a computing module adapt to obtain coordinate transformations parameters between the direction features of the first reference plane and the direction features of the second reference plane through coordinate transformations;

a combining module adapt to generate a combination code by adding program codes applied to the machine tool in the coordinate transformations parameters, such that the machine tool machines a plurality of planes with various direction features by using the combination code; and wherein after the computing module calculates the coordinate transformations parameters, the machine tool would use the coordinate transformations parameters to make the tool and the worktable perform a testing motion and the combining module proceeds to run after ensuring that the testing motion can be carried out.

6. The machine tool for tilted plane machining according to claim 5, wherein the obtaining module comprises at least one sensor detecting locations of a positioning component, the direction features of the first reference plane is generated by predetermined setting, and through the sensor generating a plurality of position parameters, the direction features of the second reference plane are generated from the position parameters.

7. The machine tool for tilted plane machining according to claim 5, wherein the obtaining module comprises a model reading apparatus for input a 3D model, and the direction features of the first reference plane as well as the second reference plane are obtained via the 3D model.

8. The machine tool for tilted plane machining according to claim 5, wherein the machine tool comprises an interactive operating interface, and the interactive operating interface can show the spatial relationship between the first reference plane and the second reference plane in a virtual space.

* * * * *